US007833588B2

(12) United States Patent
Mikoshiba et al.

(10) Patent No.: US 7,833,588 B2
(45) Date of Patent: Nov. 16, 2010

(54) TRANSPARENT CONDUCTIVE LAMINATE, TOUCH PANEL AND TOUCH PANEL-EQUIPPED LIQUID CRYSTAL DISPLAY

(75) Inventors: Hitoshi Mikoshiba, Tokyo (JP); Haruhiko Ito, Tokyo (JP); Isao Shiroishi, Tokyo (JP)

(73) Assignee: Teijin Limited, Osaka (JP)

( * ) Notice: Subject to any disclaimer, the term of this patent is extended or adjusted under 35 U.S.C. 154(b) by 435 days.

(21) Appl. No.: 10/533,561

(22) PCT Filed: Dec. 18, 2003

(86) PCT No.: PCT/JP03/16240

§ 371 (c)(1),
(2), (4) Date: May 3, 2005

(87) PCT Pub. No.: WO2004/057381

PCT Pub. Date: Jul. 8, 2004

(65) Prior Publication Data

US 2006/0013967 A1    Jan. 19, 2006

(30) Foreign Application Priority Data

Dec. 20, 2002    (JP)    ............................. 2002-369580

(51) Int. Cl.
*C09K 19/04*    (2006.01)
*B32B 5/16*    (2006.01)
(52) U.S. Cl. ................... 428/1.1; 428/1.33; 349/117; 349/119
(58) Field of Classification Search .............. 349/12, 349/117, 118, 119, 120; 428/689, 156, 323, 428/1.3, 1.33, 1.54
See application file for complete search history.

(56) References Cited

U.S. PATENT DOCUMENTS

| 5,463,013 | A | * | 10/1995 | Tokuda et al. .............. 528/196 |
| 6,025,958 | A | * | 2/2000 | Yamaoka et al. ............ 359/494 |
| 6,411,344 | B2 | | 6/2002 | Fujii et al. |
| 6,611,299 | B1 | * | 8/2003 | Fujii et al. ..................... 349/12 |
| 6,628,359 | B1 | * | 9/2003 | Terashita et al. ............ 349/120 |

(Continued)

FOREIGN PATENT DOCUMENTS

CN    1202634 A    12/1998

(Continued)

OTHER PUBLICATIONS

International Search Report mailed on Mar. 23, 2004.

(Continued)

*Primary Examiner*—Rena L Dye
*Assistant Examiner*—Michele Jacobson
(74) *Attorney, Agent, or Firm*—Rader, Fishman & Grauer PLLC (57) ABSTRACT

The transparent conductive laminate of the invention is a laminate comprising a film made of a polymer with a photo-elastic constant of no greater than $70 \times 10^{-12}$ $Pa^{-1}$, a light-scattering layer with a haze value in the range of 0.2-1.4% formed on one side thereof, and a transparent conductive layer formed on the other side thereof, wherein the laminate exhibits an overall retardation of $\lambda/4$. By using the laminate it is possible to provide touch panels with reduced light reflection, no coloration, excellent visibility and high reliability for outdoor use, as well as touch panel-equipped liquid crystal displays employing them.

17 Claims, 4 Drawing Sheets

U.S. PATENT DOCUMENTS

| | | | |
|---|---|---|---|
| 6,689,458 B1 * | 2/2004 | Mikoshiba et al. | 428/339 |
| 6,707,519 B1 * | 3/2004 | Okumura et al. | 349/114 |
| 6,734,946 B2 * | 5/2004 | Hanada et al. | 349/158 |
| 6,771,327 B2 * | 8/2004 | Sekiguchi | 349/12 |
| 6,958,797 B2 * | 10/2005 | Kawahara et al. | 349/115 |
| 6,964,814 B2 * | 11/2005 | Fujii et al. | 428/423.1 |
| 7,190,354 B2 | 3/2007 | Tanaka et al. | 345/173 |
| 2002/0005925 A1 * | 1/2002 | Arakawa | 349/117 |
| 2003/0086027 A1 * | 5/2003 | Uchiyama et al. | 349/1 |
| 2004/0151895 A1 * | 8/2004 | Itoh et al. | 428/327 |
| 2004/0239641 A1 * | 12/2004 | Takahata et al. | 345/173 |
| 2005/0096431 A1 * | 5/2005 | Fujii et al. | 525/178 |
| 2005/0206810 A1 * | 9/2005 | Sasaki et al. | 349/96 |
| 2006/0013967 A1 * | 1/2006 | Mikoshiba et al. | 428/1.1 |
| 2006/0072045 A1 * | 4/2006 | Tanabe et al. | 349/12 |
| 2006/0146207 A1 * | 7/2006 | Cho et al. | 349/12 |
| 2006/0237864 A1 * | 10/2006 | Morita et al. | 264/1.34 |
| 2007/0193685 A1 * | 8/2007 | Tsujiuchi et al. | 156/325 |

FOREIGN PATENT DOCUMENTS

| | | | |
|---|---|---|---|
| CN | 1311863 A | | 9/2001 |
| CN | 1383495 A | | 12/2002 |
| EP | 1 103 885 A1 | | 5/2001 |
| EP | 1 174 737 A2 | | 1/2002 |
| EP | 1197768 A1 | | 4/2002 |
| JP | 05-050561 | | 3/1993 |
| JP | 05-050561 A | | 3/1993 |
| JP | 05-127822 A | | 5/1993 |
| JP | 2000-112663 A | | 4/2000 |
| JP | 2000-301648 A | | 10/2000 |
| JP | 2000-302988 | | 10/2000 |
| WO | WO-99/66391 A1 | | 12/1999 |
| WO | WO 01/16963 | * | 3/2001 |
| WO | WO 02/088784 A2 | | 11/2002 |

OTHER PUBLICATIONS

Office Action issued on Jan. 19, 2007 (China).

Japanese Office Action for application No. 2004-562051 dated Aug. 14, 2007.

Supplementary Partial European Search Report, for European Application No. 03782802.7, mailed Aug. 14, 2007 (3 pages).

* cited by examiner

TRANSPARENT CONDUCTIVE LAMINATE, TOUCH PANEL AND TOUCH PANEL-EQUIPPED LIQUID CRYSTAL DISPLAY

FIELD OF THE INVENTION

The present invention relates to a transparent conductive laminate. More specifically, it relates to a transparent conductive laminate that is particularly suitable for use in touch panels and touch panel-equipped liquid crystal displays.

BACKGROUND ART

Recently, the wide employment of information-processing equipment, on which a liquid crystal display for displaying information and a touch panel (called a touch screen, a transparent membrane switch) for inputting information were mounted, began. Most of the touch panels are resistance film type ones. The resistance film type touch panels are fabricated by setting two transparent electrode substrates (a movable electrode substrate and a fixed electrode substrate) having transparent conductive layers formed thereon, respectively, facing each other at a distance of 10 to 100 µm. In order to maintain insulation between the movable electrode substrate and fixed electrode substrate in the absence of external force, dot spacers are usually formed on the electrode surface of the fixed electrode substrate. Due to this construction a touch by a finger or pen on the outside of the movable electrode substrate causes contact between the electrode surfaces of the movable electrode substrate and fixed electrode substrate only at the touched site, thereby resulting in switch and, for example, allowing selection of a menu on the liquid crystal display or input of a drawn figure or written characters.

Such information-processing equipments having touch panel-equipped liquid crystal display are often used in portable form in the case of, for example, camcorders, PDAs (Personal Digital Assistants), smart phones and the like. Because the touch panel-equipped liquid crystal displays of such portable information-processing equipments are generally used outdoors, they are inevitably used under light sources emanating from different directions. Consequently, noise light (reflected light from the touch panel section) also enters the eye simultaneously with the image recognition light (for example, light from the liquid crystal display), thus rendering the display more difficult to distinguish.

Japanese Unexamined Patent Publication HEI No. 5-127822 describes a touch panel which reduces reflected light by a laminated construction of a ¼ wavelength retardation film, a polarizing plate and a nonglare-treated transparent film, in that order on the touch panel section. The touch panel is effective for reducing reflected light from the touch panel section, but coloration of light from the liquid crystal display by the ¼ wavelength retardation film has been a problem.

WO99/66391 discloses a touch panel employing a retardation film having a retardation of 90-200 nm and a photoelastic constant of $5 \times 10^{-13}$ cm$^2$/dyne to $65 \times 10^{-13}$ cm$^2$/dyne ($5$-$65 \times 10^{-12}$ Pa$^{-1}$), and a pair of transparent conductive substrates. This publication also mentions that the retardation film having a transparent conductive layer formed thereon can be used for the transparent conductive substrate of the touch panel.

However, it has been found that lack of a protective layer on a side opposite to the transparent conductive layer-formed side of the retardation film can sometimes create problems during actual manufacturing, such as scratching of the retardation film during the process of forming the transparent conductive layer or the processes of making up the touch panel, or can lead to insufficient reliability of adhesion when the retardation film is attached to the polarizing plate. However, it has become apparent that when a layer, which performs a function of improving adhesion with the polarizing plate as well as a function of preventing damage during the various making up processes, is formed on the polarizing plate lamination side of the retardation film, red-green stripes become distinguishable due to film thickness deviation of the layer and thus reduce the visibility of the liquid crystal display.

On the other hand, Japanese Unexamined Patent Publication HEI No. 5-50561 discloses a transparent conductive film (transparent conductive laminate) having one side of the film surface roughened to center line average roughness (Ra) in the range of 0.05-5.0 µm and having a transparent conductive layer formed on the other side, as well as a touch panel having a construction employing the transparent conductive film (transparent conductive laminate) as a lower sheet (fixed electrode substrate). When a support sheet is set in contact with the lower sheet for reinforcement of the touch panel, color stripes are produced due to light interference between the lower sheet and the support sheet hitherto, but aforementioned formation of a roughened surface on the lower sheet prevents the light interference-induced color stripes. As a method of forming the roughened surface there is mentioned a method of forming a layer comprising inorganic fine particles or organic fine particles. This method is effective for eliminating red-green stripes, but because center line average roughness is too large, the haze is increased and the visibility of the liquid crystal is thus impaired.

DISCLOSURE OF THE INVENTION

It is an object of the present invention to provide a novel transparent conductive laminate that exhibits a λ/4 retardation.

It is another object of the invention to provide the aforementioned laminate that has enhanced visibility and is particularly easy to see when used in a touch panel.

It is yet another object of the invention to provide a touch panel and a touch panel-equipped liquid crystal display employing the aforementioned laminate.

These and other objects and advantages of the invention will become apparent from the detailed description that follows.

According to the present invention, these objects and advantages are achieved, firstly, by a transparent conductive laminate which comprises a film made of a polymer with a photoelastic constant of no greater than $70 \times 10^{-12}$ Pa$^{-1}$ (polymer film A), a light-scattering layer with a haze value in the range of 0.2-1.4% formed on one side thereof, and a transparent conductive layer formed on the other side thereof, and overall exhibits a λ/4 retardation.

The objects and advantages of the invention are achieved, secondly, by a touch panel and a touch panel-equipped liquid crystal display having the aforementioned laminate situated at a specific position.

EXPLANATION OF SYMBOLS

1: Anti-glare hard coat layer
2: Light-scattering layer (or transparent resin layer)
3: Retardation film
4: Cured resin layer
5: Transparent conductive layer
6: Dot spacer
7: Transparent conductive layer
8: Glass substrate
9: High refractive index layer
10: Low refractive index layer
11: Retardation film
12: Polymer film
13: Polarizing plate
14-1: Transparent conductive laminate
14-2: Transparent conductive laminate
15: Transparent conductive laminate
16: Transparent conductive laminate
17: Transparent conductive laminate
18: Retardation film
19: Polarizing plate
20: Retardation film
21: Liquid crystal cell
22: Polarizing plate

PREFERRED EMBODIMENTS OF THE INVENTION

The transparent conductive laminate of the invention comprises a film made of a polymer (hereinafter referred to as "polymer film A"), a light-scattering layer on one side thereof and a transparent conductive layer on the other side thereof. Also, the laminate overall exhibits a λ/4 retardation.

Polymer film A may consist of a single layer film, or it may be composed of a laminate of two or more films.

When it consists of a single layer film, it may be a film having a function exhibiting a λ/4 retardation by the single layer film alone, or in other words, it may be a λ/4 retardation film.

When the polymer film A is composed of a laminate of two or more films, it may be, for example, (i) a laminated film having a single layer film exhibiting λ/4 retardation set in contact with a single layer film having excellent optical isotropy (for example, a retardation (Δnd) value of no greater than 30 nm), (ii) a laminated film having a single layer film exhibiting a λ/4 retardation and a single layer film exhibiting a λ/2 retardation set in contact with a single layer film having excellent optical isotropy (for example, a retardation (Δnd) value of no greater than 30 nm), or (iii) a laminated retardation film comprising a single layer film exhibiting λ/4 retardation and a film exhibiting a λ/2 retardation.

The method for obtaining the film exhibiting a λ/4 retardation or a λ/2 retardation may be, for example, a method wherein a film made of a polymer with a photoelastic constant of no greater than $70 \times 10^{-12}$ $Pa^{-1}$ is uniaxially stretched (or biaxially stretched either successively or simultaneously) to exhibit a λ/4 retardation or a λ/2 retardation in the polymer film itself, or a method wherein a layer of a compound exhibiting a λ/4 retardation or a λ/2 retardation (for example, a layer composed of polymer liquid crystals) is formed on a polymer film with a photoelastic constant of no greater than $70 \times 10^{-12}$ $Pa^{-1}$.

By using the polymer film A it is possible to provide a transparent conductive laminate exhibiting overall λ/4 retardation. In particular, the polymer film A is preferably a laminated film having a single layer film exhibiting a λ/4 retardation and a single layer film exhibiting a λ/2 retardation laminated in contact with a single layer film having excellent optical isotropy (for example, a retardation (Δnd) value of no greater than 30 nm), or a laminated retardation film comprising a single layer λ/4 retardation film and a single layer λ/2 retardation film, in order to exhibit overall an excellent wide-range λ/4 retardation.

Figure 1:
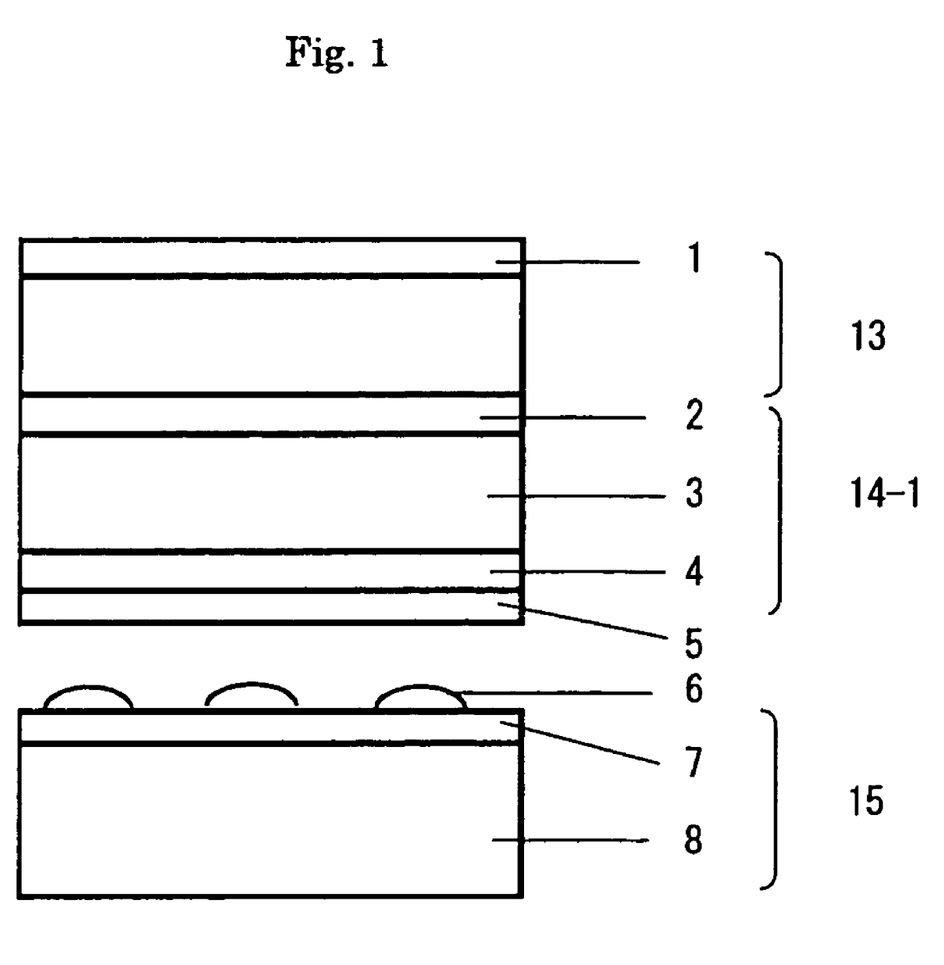
FIG. 1 is a schematic view of the touch panel fabricated in Example 1 (and Comparative Example 1).
Figure 2:
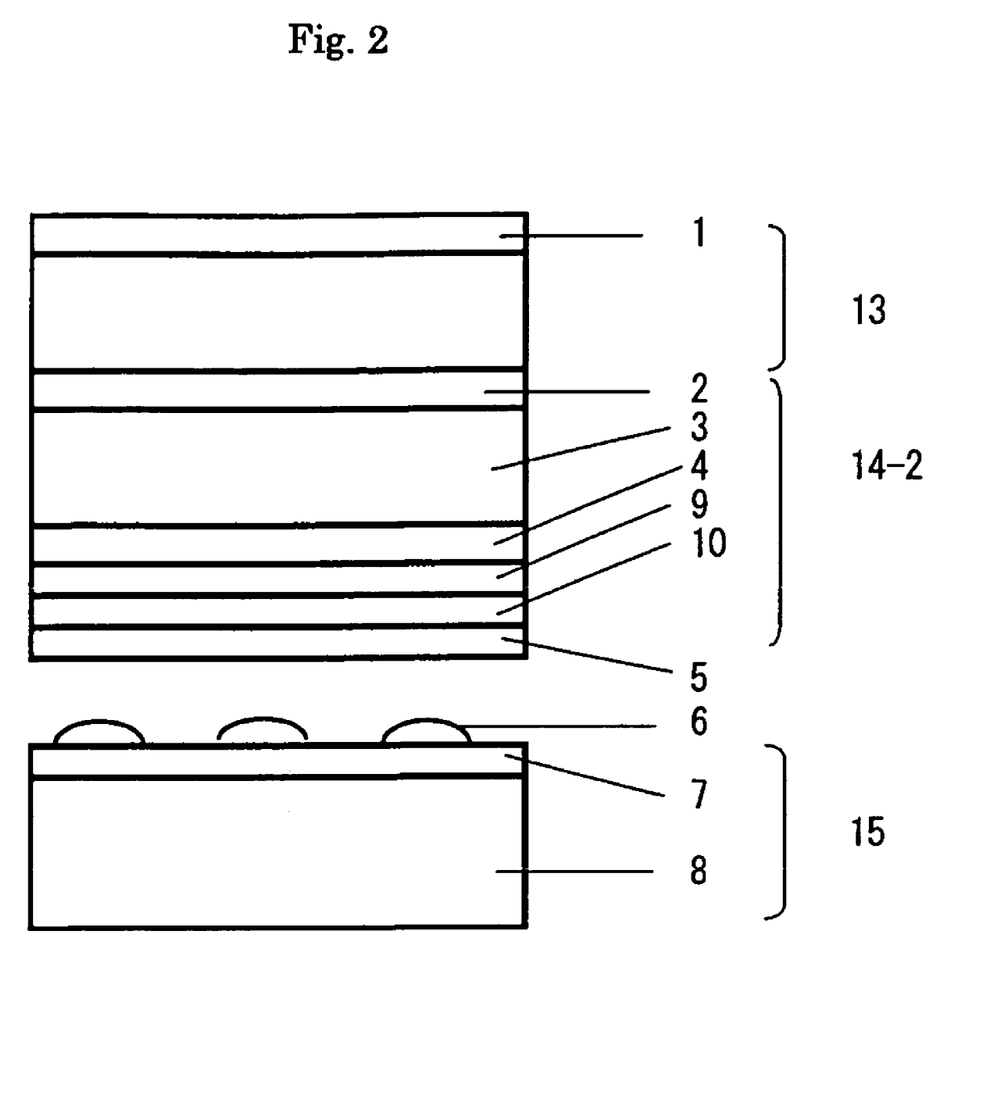
FIG. 2 is a schematic view of the touch panel fabricated in Example 2.
Figure 3:
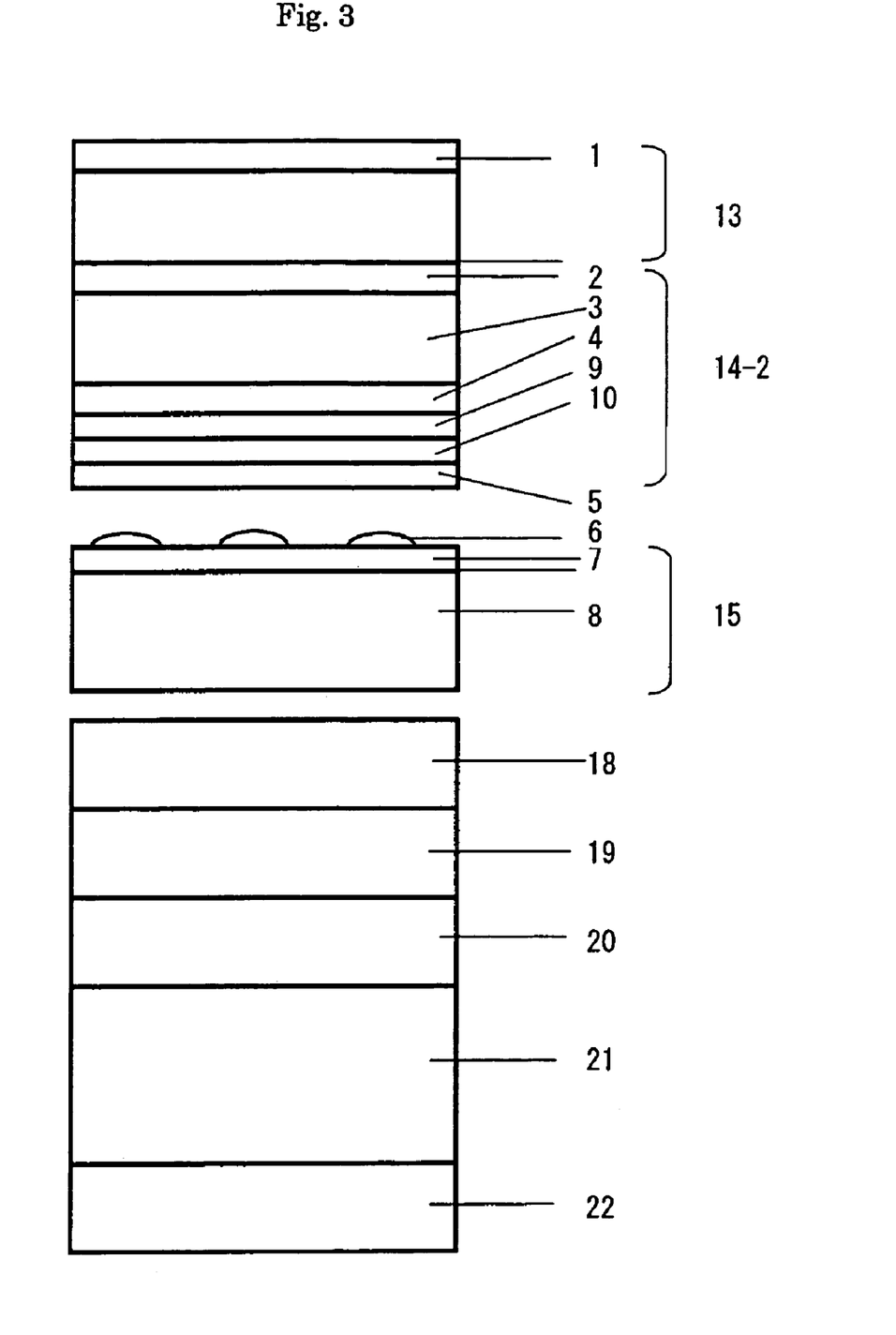
FIG. 3 is a schematic view of the touch panel-equipped liquid crystal display fabricated in Example 3 (and Comparative Example 2).

A preferred embodiment of the invention is shown in FIG. 1. FIG. 1 is a schematic view of the touch panel fabricated in Example 1 described below. The transparent conductive laminate P (14-1) shown in FIG. 1 has a construction wherein a transparent conductive layer (5) is situated on one side of a polymer film A (3: λ/4 retardation film) via a cured resin layer (4), and a light-scattering layer (2) is formed on the other side of the polymer film A. The polymer film A has the function of producing overall a λ/4 retardation for the transparent conductive laminate P (14-1). The transparent conductive laminate P (14-1) is also laminated with a polarizing plate (13), and a transparent conductive laminate R (15) is situated under these across a gap to construct a touch panel.

The transparent conductive laminate of the invention also includes types wherein another film made of a polymer with a photoelastic constant of no greater than $70 \times 10^{-12}$ $Pa^{-1}$ (hereinafter referred to as polymer film B) is laminated on the surface of the aforementioned polymer film A opposite to the side on which the transparent conductive layer is formed.

In this case, the function of either the polymer film A or polymer film B may provide the laminate with overall a λ/4 retardation, or the combined function of the polymer film A and polymer film B may provide the laminate with overall a λ/4 retardation. The in-plane retardation value required for polymer film A will differ depending on its relationship with polymer film B.

For a laminate wherein the function of the polymer film A provides the laminate with overall a λ/4 retardation, the embodiment described above may be used as the polymer film A. In such cases, the polymer film B may be one with excellent optical isotropy (for example, a retardation value (Δnd) of no greater than 30 nm), which does not inhibit the overall effect. Such a polymer film B is preferably used together with the polymer film A as the electrode substrate for the touch panel, so as to become a support for increased overall strength.

As laminate wherein the function of the polymer film B provides a λ/4 retardation for the laminate overall, there may be mentioned examples wherein the polymer film A is a film with excellent optical isotropy (for example, a retardation value (Δnd) of no greater than 30 nm), and the polymer film B is (i) a single layer film exhibiting a λ/4 retardation or (ii) a laminated retardation film having a single layer film exhibiting a λ/4 retardation and a single layer film exhibiting λ/2 retardation.

The method for obtaining a film exhibiting a λ/4 retardation or a λ/2 retardation may be, for example, a method wherein a film made of a polymer with a photoelastic constant of no greater than $70 \times 10^{-12}$ $Pa^{-1}$ is uniaxially stretched (or biaxially stretched either successively or simultaneously) to exhibit a λ/4 retardation or a λ/2 retardation in the polymer film itself, or a method wherein a layer of a compound exhibiting a λ/4 retardation or a λ/2 retardation (for example, a layer composed of polymer liquid crystals) is formed on a polymer film with a photoelastic constant of no greater than $70 \times 10^{-12}$ $Pa^{-1}$. In a laminate wherein the polymer film B functions to provide a laminate exhibiting overall a λ/4 retardation, the polymer film B is most preferably a laminated retardation film having a single layer λ/4 retardation film and a single layer λ/2 retardation film, in order to exhibit overall an excellent wide-range λ/4 retardation.

In a laminate wherein the polymer film A and polymer film B both function to provide a laminate exhibiting overall a λ/4 retardation, the aforementioned film exhibiting a λ/4 retardation may be used for either the polymer film A or polymer film B, while using the aforementioned film exhibiting a λ/2 retardation as the other.

In particular, using a single λ/4 retardation film as the polymer film A and a single λ/2 retardation film as the polymer film B is preferred in order to exhibit overall an excellent wide-range λ/4 retardation by the action of both the polymer films A and B.

Figure 4:
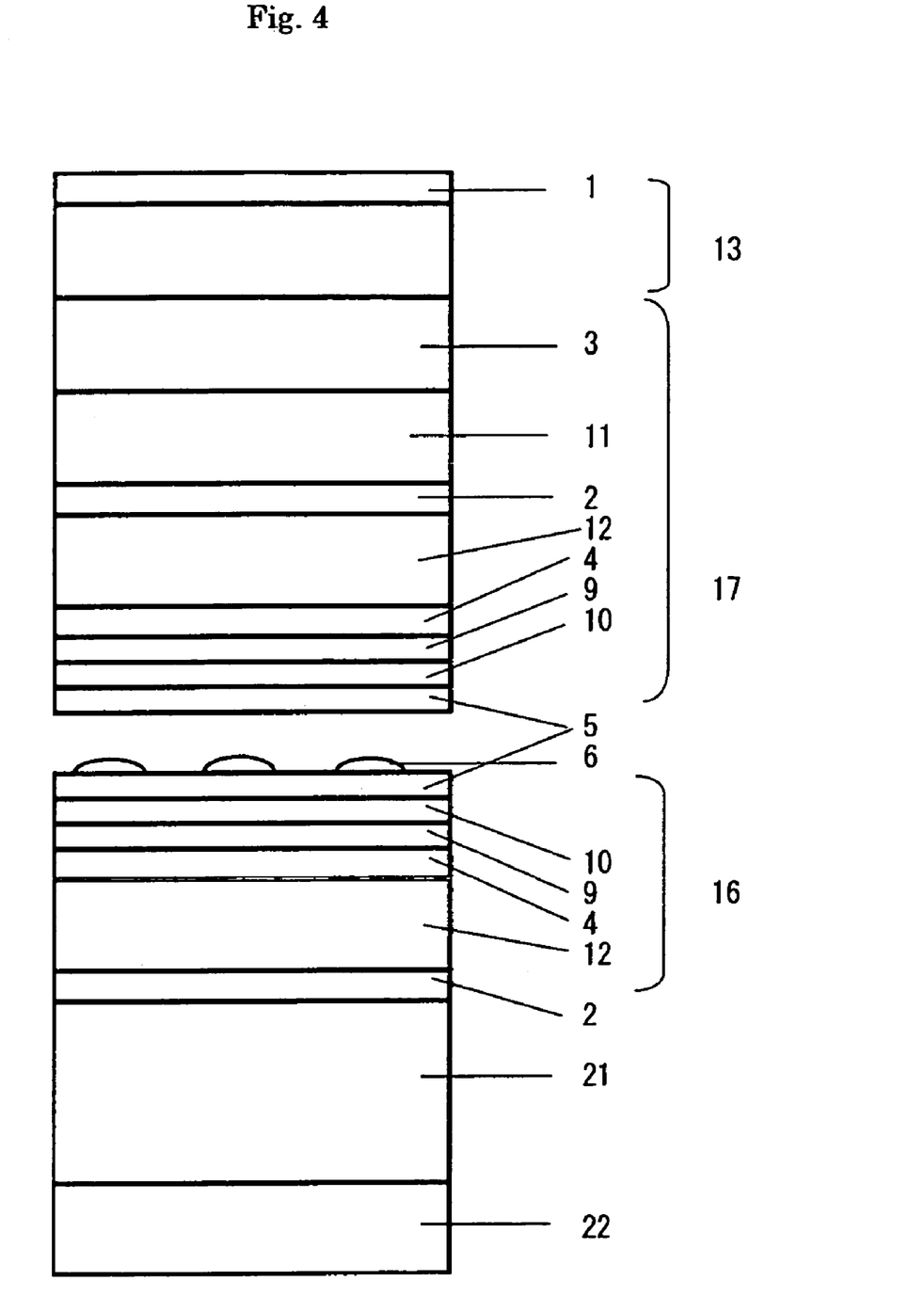
FIG. 4 is a schematic view of the touch panel-equipped liquid crystal display fabricated in Example 4.

A preferred embodiment of the invention is shown in FIG. 4. FIG. 4 is a schematic view of the touch panel-equipped liquid crystal display of Example 4 described below. In FIG. 4, a transparent conductive layer (5) is situated on one side of a polymer film A (12: optical isotropy film) via a cured resin layer (4), a high refractive index layer (9) and low refractive index layer (10) while a light-scattering layer (2) is formed on the other side of the polymer film A, and polymer film B (a laminated retardation film comprising a λ/4 retardation film (11) and a λ/2 retardation film (3)) is set thereover. In this case, the polymer film B (the laminated retardation film) exhibits overall a λ/4 retardation for the transparent conductive laminate P (17). A touch panel may be constructed with a laminate comprising a polarizing plate (13) and the aforementioned transparent conductive laminate P (17), and a transparent conductive laminate R (16) situated under these across a gap. This touch panel may then be laminated with a liquid crystal cell (21) and a polarizing plate (22) to construct a touch panel-equipped liquid crystal display.

The liquid crystal cell comprises liquid crystals enclosed between transparent conductive substrates, but display cannot be achieved with a liquid crystal cell alone. A liquid crystal display functions by combination of a liquid crystal cell, a polarizing plate and a retardation film.

<Polymer Film A>

The polymer film A used for the invention has a photoelastic constant of no greater than $70 \times 10^{-12}$ $Pa^{-1}$, and preferably no greater than $64 \times 10^{-12}$ $Pa^{-1}$. In a touch panel constructed using a transparent conductive laminate having a transparent conductive layer formed on a conventional film made of a polymer having a photoelastic constant exceeding $70 \times 10^{-12}$ $Pa^{-1}$, together with a polarizing plate and a retardation film, coloration often occurs in an arc shape from the bonded section (seal) toward the inside upon heating at 80° C. In a touch panel employing a polymer film A according to the invention, such coloration can be notably inhibited. By also using a film A made of a polymer having a photoelastic constant of no greater than $70 \times 10^{-12}$ $Pa^{-1}$, it is also possible to notably inhibit variation in the retardation during the manufacturing processes. There are no particular restrictions on the lower limit of the photoelastic constant, but it will normally be $0.5 \times 10^{-12}$ $Pa^{-1}$ ($0.5 \times 10^{-13}$ $cm^2$/dyne).

As polymers having photoelastic constants of no greater than $70 \times 10^{-12}$ $Pa^{-1}$ there may be mentioned thermoplastic resins such as fluorene ring- or isophorone ring-containing aromatic polycarbonates. Specifically, they are polycarbonates in which a repeating unit represented by the following formula (I) accounts for 70-30 mole percent and preferably 70-35 mole percent of the total repeating units.

In formula (I), $R_1$-$R_8$ each independently represent at least one group selected from among hydrogen, halogens and C1-6 hydrocarbon groups. As examples of hydrocarbon groups there may be mentioned alkyl groups such as methyl and ethyl, or aryl groups such as phenyl.

X may be a group represented by the following formula:

(fluorene component), or a group represented by the following formula:

(isophorone component). $R_9$ and $R_{10}$ each independently represent hydrogen, a halogen or a C1-3 alkyl group such as methyl.

More preferred polycarbonate materials are those composed of a repeating unit represented by formula (I) above and a repeating unit represented by the following formula (II):

wherein the repeating unit represented by formula (I) accounts for 70-30 mole percent of the total repeating units of the polycarbonate, based on the total of formulas (I) and (II) above.

$R_{11}$-$R_{18}$ in formula (II) above each independently represent at least one group selected from among hydrogen, halogens and C1-22 hydrocarbon groups, and Y represents at least one group selected from among groups represented by the following formulas.

Among the groups for Y, $R_{19}$-$R_{21}$, $R_{23}$ and $R_{24}$ each independently represent hydrogen, a halogen or a C1-22 hydrocarbon group such as an alkyl and aryl group, $R_{22}$ and $R_{25}$ each independently represent a C1-22 hydrocarbon group such as an alkyl or aryl group, and $Ar_1$-$Ar_3$ each independently represent a C6-10 aryl group such as phenyl.

More preferably, the polycarbonate is a polycarbonate comprising a repeating unit represented by the following formula (III):

and a repeating unit represented by the following formula (IV).

In formula (III) above, $R_{26}$ and $R_{27}$ each independently represent hydrogen or methyl. $R_{26}$ and $R_{27}$ are both preferably methyl.

In formula (IV) above, $R_{28}$ and $R_{29}$ each independently represent hydrogen or methyl, and preferably hydrogen.

The polycarbonate may be a copolymer, or a polymer blend (blend or blend polymer). Two or more different types of copolymers may also be combined, or two or more different homopolymers or a homopolymer and a copolymer may be blended.

As examples of polymers having photoelastic constants of no greater than $70 \times 10^{-12}$ $Pa^{-1}$ ($70 \times 10^{-13}$ $cm^2/dyne$) there may be mentioned, in addition to those referred to above, cycloolefin polymer. As polymer films made of cycloolefin polymer there may be mentioned "TPX" and "APO" by Mitsui Petroleum Chemicals Co., Ltd., and "ZEONOR" by Nihon Zeon, and "ARTON" by JSR Co., Ltd.

The polymer used to manufacture the polymer film A is preferably one with high heat resistance because of the ordinary heating processes for manufacturing the transparent conductive laminate or making the transparent conductive laminate into a touch panel.

Heat resistance is correlated with the glass transition temperature (Tg), and DSC may measure the Tg. In the case of using a polymer with a low photoelastic constant, if the Tg of the polymer is 10° C. or more higher than the process temperature, the retardation of the film in the process will be prevented from varying. In the case of a polymer with a relatively high photoelastic constant, the Tg is preferably at least 45° C. above the process temperature in order to prevent retardation variation in the process. For example, if the process temperature is 125° C., and a cycloolefin polymer having a photoelastic constant of no greater than $7 \times 10^{-12}$ $Pa^{-1}$ ($7 \times 10^{-13}$ $cm^2/dyne$) is used, the Tg is preferably at least 135° C. In the case of a thermoplastic resin such as a polycarbonate resin having a photoelastic constant of $39$-$70 \times 10^{-12}$ $Pa^{-1}$ ($70 \times 10^{-13}$ $cm^2/dyne$), the Tg is preferably at least 170° C.

The method for manufacturing the polymer film A may be a publicly-known melt extrusion method, solution casting method or the like. The solvent for solution casting is preferably methylene chloride, dioxolane or the like in the case of the aforementioned polycarbonate, for example.

The thickness of the polymer film A will usually be 50-200 μm, and preferably 70-150 μm.

The transparent conductive laminate of the invention is characterized by exhibiting a λ/4 retardation as the laminate itself. That is, the laminate of the invention has the same function as a "λ/4 retardation film", whereby linear polarized light, which has passed through a polarizing plate, and then passes from one side of the laminate of the invention through to the other side, can be converted to circular polarized light.

Thus, when fabricating a touch panel using a laminate comprising a polarizing plate and a transparent conductive laminate of the invention, together with another transparent conductive laminate situated under them across a gap, it is possible to reduce reflection of external light on the touch panel.

The principle by which reflection of external light on the touch panel is reduced is as follows.

Specifically, incident light which has passed through a polarizing plate on the input operation side, that is to say linear polarized light passes through the ¼ wavelength retardation film on the movable electrode substrate side and is converted to circular polarized light, which is reflected at the electrode surface of a movable electrode substrate or the electrode surface of a fixed electrode substrate, to become reverse circular polarized light. When it again passes through the ¼ wavelength retardation film on the movable electrode substrate side, it is converted to linear polarized light. The plane of polarization is rotated 90° against the incident light and is therefore absorbed by the polarizing plate, thus inhibiting reflection of the touch panel.

Touch panel-equipped liquid crystal displays employing a transparent conductive laminate of the invention may be classified into the following two types, which will be referred to as "circular polarizing plate type" and "integrated type" for the purpose of the invention.

(1) Circular Polarizing Plate Type

A circular polarizing plate type touch panel-equipped liquid crystal display of the invention has a construction with a touch panel comprising a laminate of a polarizing plate 1 and a transparent conductive laminated body P exhibiting a λ/4 retardation, together with another transparent conductive laminate R situated under them across a gap, a retardation film 2, a polarizing plate 2, a retardation film 3, a liquid crystal cell and a polarizing plate 3, laminated in that order from the input operation side.

Here, the liquid crystal display is constructed with the polarizing plate 2, retardation film 3, liquid crystal cell and polarizing plate 3. The transparent conductive laminate R must have a retardation value of no greater than 30 nm so that it may not affect the polarized light. The retardation film 2 is a λ/4 retardation film, and the optical axis of the transparent conductive laminate P and the optical axis of the retardation film 2 are mutually orthogonal. When light exiting from the polarizing plate 2 passes through the two ¼ wavelength retardation films whose optical axes are mutually orthogonal, the retardation is essentially cancelled out, so that the polarized light reaches the polarizing plate on the input operation side without undergoing any alteration whatsoever and either passes through the polarizing plate or is absorbed by the polarizing plate to produce an image. It is thereby possible to prevent coloration of light leaving the polarizing plate 2.

(2) Integrated Type

An integrated type touch panel-equipped liquid crystal display of the invention has a construction with a touch panel comprising a laminate of a polarizing plate 1 and a transparent conductive laminated body P exhibiting a λ/4 retardation, together with another transparent conductive laminate R situated under them across a gap, a liquid crystal cell and a polarizing plate 3, laminated in that order from the input operation side.

Here, the liquid crystal display is constructed with the polarizing plate 1, a transparent conductive laminated body P exhibiting a λ/4 retardation, a liquid crystal cell and a polarizing plate 3. Since there is no effect on polarized light if the retardation value of the transparent conductive laminate R is 30 nm or less, almost no coloration occurs even when it is integrated into a touch panel.

To exhibit a λ/4 retardation is, ideally, to exhibit a λ/4 retardation with respect to all of the wavelengths in the visible light range. However, when retardation at a wavelength of 550 nm is λ/4, there is no problem in practice even if the retardation deviates somewhat from λ/4 at other wavelengths. The retardation value (Δnd) at a wavelength of 550 nm is preferably 125-150 nm, and more preferably 131-145 nm. A retardation value above or below this range is not preferred because it will decrease the reflection-reducing effect for external light when used in combination with the polarizing plate.

In the circular polarizing plate type described above, the retardation film 2 is preferably a λ/4 retardation film to increase visibility.

There are no particular restrictions on the material used to manufacture the retardation film 2, but the difference in the retardation value with respect to the transparent conductive laminate P of the invention at a wavelength of 550 nm is preferably no greater than 10 nm. Coloration may become noticeable if the retardation value difference is greater than 10 nm. Coloration may also become noticeable with a large difference in wavelength dispersion between the transparent conductive laminate P and the retardation film 2. Consequently, the difference in wavelength dispersion between the transparent conductive laminate P and the retardation film 2 is preferably small. Specifically, representing the retardation values at wavelengths of 450 nm, 550 nm and 650 nm as R(450), R(550) and R(650) respectively, when the wavelength dispersion of the transparent conductive laminate P is R(450)/R(550)>1 and R(650)/R(550)<1, the wavelength dispersion of the retardation film 2 is also preferably R(450)/R(550)>1 and R(650)/R(550)<1. Conversely, when the wavelength dispersion of the transparent conductive laminate P is R(450)/R(550)<1 and R(650)/R(550)>1, the wavelength dispersion of the retardation film 2 is also preferably R(450)/R(550)<1 and R(650)/R(550)>1.

Forming a transparent conductive layer on at least one side of the retardation film 2 can confer an electromagnetic wave shield function.

In order to control wavelength dispersion of retardation, for example, a compound layer (for example, a polymer liquid crystal layer) exhibiting retardation may be formed on the polymer films A, B, or a compound such as low molecular liquid crystals may be included in the polymer films A, B, in a range which does not impede the effect of the invention.

The polymer film B may be made of the same material as the polymer film A. The film thickness and manufacturing process may also be the same as for the polymer film A.

<Light-Scattering Layer>

A light-scattering layer is formed on one side of the polymer film A. The light-scattering layer has the function of scattering light, but it may also sometimes function to enhance the cohesion between the polymer film A and the polymer film B or the polymer film A and the polarizing plate, or to act as a layer with the function of preventing scratches of the polymer film A during manufacturing process of the transparent conductive laminate. The light-scattering layer alone has a haze value of 0.2-1.4%, and preferably 0.3-1%. The haze value of the light-scattering layer alone may be determined as the difference in the haze value before formation and after formation of the light-scattering layer on the polymer film A. If the haze value of the light-scattering layer alone is less than 0.2%, red-green stripes become distinguishable due to film thickness deviation, thus reducing the visibility of the liquid crystal display. The slip property is also impaired, thereby eliminating the effect of preventing scratches of the polymer film A during manufacturing process of the transparent conductive laminated. A haze value of greater than 1.4% will also tend to impair the visibility of the liquid crystal display.

The thickness of the light-scattering layer is preferably 1-5 μm and more preferably 1-4 μm. When the surface contains unevenness and is not substantially flat, the thickness is defined as the average value of measuring the film thickness at more than 10 arbitrary points.

The light-scattering layer scatters light inside and/or on the surface of the layer. The method of forming the light-scattering layer on the surface of the polymer film A may be, for example, a method of forming a polymer layer containing fine particles, or a method of producing fine-unevenness on the surface during forming a polymer layer containing no fine particles. In the former method, light scattering occurs inside the light-scattering layer due to the use of fine particles that have a different refractive index than the polymer. By using particles having a larger mean diameter than the thickness of the polymer layer, light scattering will occur on the surface regardless of the refractive index of the fine particles, because fine unevenness will be produced on the surface. In the latter method, unevenness may be formed by contacting an emboss roll or the like with the surface of the polymer layer during forming the polymer layer.

The light-scattering layer will have unevenness except in the case of utilizing only light scattering inside the light-scattering layer, and as surface texture parameter, a center line average roughness (Ra) is preferably in the range of 0.005-0.04 μm.

A polymer layer containing fine particles may be formed on the surface of the polymer film A by, for example, coating, spraying or lamination.

As examples of fine particles to be used to form a polymer layer containing fine particles by coating, there may be mentioned silica fine particles, crosslinked acrylic fine particles, crosslinked polystyrene fine particles and the like. The haze value of the light-scattering layer may be adjusted by varying a diameter of the fine particles, the mixing ratio of the fine particles to polymer, and the film thickness of the polymer layer.

Examples of polymers include silicon atom-containing polymers obtained using silicon alkoxides such as methyltriethoxysilane or phenyltriethoxysilane as monomers, melamine thermosetting resins such as etherified methylolmelamine or the like, phenoxy thermosetting resins, epoxy thermosetting resins, and polyfunctional acrylate resins obtained using polyfunctional acrylate monomers such as polyol acrylates, polyester acrylates, urethane acrylates, epoxy acrylates or the like. These acrylate resins may be either thermosetting resins or radiation curing resins. Radiation curing resins are resins that undergo polymerization by irradiation with ultraviolet rays, electron beams or the like.

Among these, polyfunctional acrylate monomers which undergo polymerization by irradiation facilitate the production process because they yield polymer layers with a high degree of crosslinking within a relatively short period of time. They are also preferred because of the high strength of the resulting layers themselves.

As polyfunctional acrylate monomers there may be mentioned those containing polyfunctional acrylate components having two or more acryloyl groups in the unit structure. Specific examples thereof which are preferred for such uses include various acrylate monomers such as trimethylolpropane triacrylate, trimethylolpropane ethylene oxide-modified triacrylate, trimethylolpropane propylene oxide-modified triacrylate, isocyanuric acid ethylene oxide-modified triacrylate, pentaerythritol tetraacrylate, dipentaerythritol pentaacrylate, dipentaerythritol hexaacrylate and dimethyloltricyclodecane diacrylate, as well as polyfunctional acrylate oligomers such as polyester-modified acrylates, urethane-modified acrylates, epoxy-modified acrylates and the like. These resins may be used as simple composition or as mixed composition of a plurality of types, and depending on the case, an appropriate amount of a silicon alkoxide hydrolysis condensate is preferably added to the composition.

When polymerization of the resin layer is carried out with ultraviolet irradiation, an appropriate amount of a publicly-known photoinitiator is added. As examples of photoinitiators there may be mentioned acetophenone-based compounds such as diethoxyacetophenone, 2-methyl-1-{4-(methylthio)phenyl}-2-morpholinopropane, 2-hydroxy-2-methyl-1-phenylpropan-1-one and 1-hydroxycyclohexylphenyl ketone; benzoin-based compounds such as benzoin and benzyldimethyl ketal; benzophenone-based compounds such as benzophenone and benzoylbenzoic acid; and thioxanthone-based compounds such as thioxanthone and 2,4-dichlorothioxanthone.

As phenoxy thermosetting resin layers there may be mentioned polymer layers obtained by thermally crosslinking phenoxy resins, phenoxyether resins and phenoxyester resins represented by formula (1) below with polyfunctional isocyanate compounds.

(1)

In formula (1), $R^1$-$R^6$ may be the same or different and represent hydrogen or C1-3 alkyl, $R^7$ represents C2-5 alkylene, X represents an ether or ester, m represents an integer of 0-3 and n represents an integer of 20-300. Most preferably, $R^1$ and $R^2$ are methyl, $R^3$-$R^6$ are hydrogen and $R^7$ is pentylene from the standpoint of facilitating synthesis and increasing productivity.

The polyfunctional isocyanate compound may be any compound having two or more isocyanate groups in the molecule, and examples thereof include polyisocyanates such as 2,6-tolylene diisocyanate, 2,4-tolylene diisocyanate, tolylene diisocyanate-trimethylolpropane adduct, t-cyclohexane-1,4-diisocyanate, m-phenylene diisocyanate, p-phenylene diisocyanate, hexamethylene diisocyanate, 1,3,6-hexamethylene triisocyanate, isophorone diisocyanate, 1,5-naphthalene diisocyanate, tlidine diisocyanate, xylylene diisocyanate, hydrogenated xylylene diisocyanate, diphenylmethane-4,4'-diisocyanate, hydrogenated diphenylmethane-4,4'-diisocyanate, lysine diisocyanate, lysine ester triisocyanate, triphenylmethane triisocyanate, tris(isocyanatophenyl)thiophosphate, m-tetramethylxylylene diisocyanate, p-tetramethylxylylene diisocyanate, 1,6,11-undecane triisocyanate, 1,8-diisocyanate-4-isocyanate methyloctane, bicycloheptane triisocyanate, 2,2,4-trimethylhexamethylene diisocyanate and 2,4,4-trimethylhexamethylene dilsocyanate, as well as their mixtures or polyhydric alcohol addition products. From the standpoint of general purpose use and reactivity, 2,6-tolylene diisocyanate, 2,4-tolylene diisocyanate, tolylene diisocyanate-trimethylolpropane adduct and hexamethylene diisocyanate are preferred.

In addition, a publicly-known tertiary amine such as triethylenediamine or an organic tin compound such as dibutyltin dilaurate may be added in an appropriate amount as a reaction accelerator to improve the crosslinking speed.

Various resins may be used as the epoxy thermosetting resin layer, but layers obtained by thermally crosslinking novolac epoxy resins represented by formula (2) below are preferred.

(2)

In formula (2) above, $R^8$ represents hydrogen or methyl, and $R^9$ represents hydrogen or glycidyl phenyl ether. The letter q represents an integer of 1-50, and although the value of q is in reality difficult to specify because it generally has a distribution, it preferably has a large average that is preferably at least 3 and more preferably at least 5.

A publicly-known curing agent may be employed for crosslinking of the epoxy resin. For example, there may be used curing agents such as amine-based polyaminoamides, acids and acid anhydrides, imidazoles, mercaptanes, phenol resins and the like. Acid anhydrides and alicyclic amines are preferred among these, with acid anhydrides being more preferred. As acid anhydrides there may be mentioned alicyclic acid anhydrides such as methylhexahydrophthalic anhydride and methyltetrahydrophthalic anhydride, aromatic acid anhydrides such as phthalic anhydride and aliphatic acid anhydrides such as dodecenylphthalic anhydride, with methylhexahydrophthalic anhydride being particularly preferred. As alicyclic amines there may be mentioned bis(4-amino-3-methyldicyclohexyl)methane, diaminocyclohexylmethane, isophoronediamine and the like, with bis(4-amino-3-methyldicyclohexyl)methane being particularly preferred.

When an acid anhydride is used as the curing agent, a reaction accelerator may be added to accelerate the curing reaction between the epoxy resin and the acid anhydride. As reaction accelerators there may be mentioned publicly-known secondary and tertiary amines such as benzylmethylamine, 2,4,6-tris(dimethylaminomethyl)phenol, pyridine and 1,8-diazabicyclo(5,4,0)undecene-1 or curing catalysts such as imidazoles.

As silicon alkoxide polymer layers there are preferably used mixtures of two or more different bi- to tetra-functional, and preferably tri- or tetra-functional silicon alkoxides, which are preferably first subjected to suitable hydrolysis and dehydrating condensation in solution for sufficient oligomerization.

Examples of silicon alkoxides include tetramethoxysilane, tetraethoxysilane, methyltrimethoxysilane, methyltriethoxysilane, dimethyldimethoxysilane, γ-glycidoxypropyl trimethoxysilane, β-(3,4-epoxycyclohexyl)ethyltrimethoxysilane, vinyltrimethoxysilane, N-β(aminoethyl)-γ-aminopropyltrimethoxysilane, N-β(aminoethyl)-γ-aminopropylmethyldimethoxysilane and γ-aminopropyltriethoxysilane.

Polymerization of these silicon alkoxides is accelerated by heating, but if necessary the coated film layer may be irradiated with active light rays such as ultraviolet rays to further increase the degree of crosslinking.

<Transparent Conductive Layer>

A transparent conductive layer is formed on the side of the polymer film A opposite to the side on which the aforementioned light-scattering layer is formed.

The transparent conductive layer used for the invention is a layer composed of a metal oxide. As examples of metal oxides there may be mentioned indium oxides containing tin, tellurium, cadmium, molybdenum, tungsten, fluorine and zinc, antimony-containing tin oxides, and oxides composed of tin oxide and cadmium oxide. Indium oxides containing tin (ITO) are preferred among these from the viewpoint of transparency and conductivity. Silicon, titanium, zinc or the like is preferably added as a third component to ITO.

The thickness of the transparent conductive layer is preferably at least 15 nm in order to achieve sufficient conductivity, and it is preferably no greater than 150 nm in order to obtain a film with sufficiently high transparency. The thickness is most preferably 17-140 nm.

<Cured Resin Layer>

Before forming the transparent conductive layer on the side of the polymer film A opposite to the side on which the light-scattering layer is formed, a cured resin layer is preferably formed on the surface of the polymer film A. The presence of a cured resin layer will prevent damage to the polymer film A by solvents during the process of manufacturing the touch panel. The thickness of the cured resin layer is preferably 0.1-10 μm, and more preferably 2-10 μm. The cured resin layer does not have to be a single layer, and may instead be a laminate of two or more layers. An anchor layer may be formed between the cured resin layer and the polymer film A for improved cohesion between them.

The cured resin used to form the cured resin layer may be the same polymer used to form the light-scattering layer.

Formation of unevenness on the cured resin layer surface by adding fine particles into the cured resin layer can prevent Newton rings generated between the movable electrode substrate and the fixed electrode substrate, for an effect of enhanced visibility. As examples of fine particles to be added to the cured resin layer there may be mentioned silica fine particles, crosslinked acrylic fine particles and crosslinked polystyrene fine particles. The unevenness on the surface may be controlled by varying the diameter of the fine particles, the mixing ratio of the fine particles to cured resin, and the film thickness of the cured resin layer.

If the cured resin layer containing fine particles as described above satisfies the following conditions:

(A) comprising (i) a cured resin component, (ii) at least one type of fine particle A having a mean primary diameter of 0.5-5 μm and (iii) at least one type of superfine particle B selected from the group consisting of metal oxides and/or metal fluorides having a mean primary diameter of no greater than 100 nm, (B) having a fine particle A content of at least 0.3 part by weight and less than 1.0 part by weight to 100 parts by weight of the resin component, (C) having a fine particle B content of at least 1 part by weight and no greater than 20 parts by weight to 100 parts by weight of the resin component, and (D) having a film thickness of 0.5-5 μm, its function will prevent Newton rings generated between the movable electrode substrate and the fixed electrode substrate, and this is preferred to reduce sparkling of the liquid crystal display.

The type of compound of the fine particles A is not particularly restricted so long as the mean primary diameter is 0.5-5 μm. For example, there may be employed fine particles of $SiO_2$, or fine particles composed of $SiO_2$ as the main component or crosslinking component, or fine particles composed mainly of a styrene-based, acrylic-based or butadiene-based polymer. Such fine particles may also be treated for surface modification or the like. Two or more different types of fine particles may also be used in combination. The fine particles A may also consist of a mixture of materials with different mean primary diameter in order to obtain the diameter distribution. According to the invention there are no particular restrictions on the content of the fine particles A, but the fine particle A content is preferably at least 0.3 part by weight and less than 1.0 part by weight, more preferably 0.3-0.9 part by weight, and even more preferably 0.3-0.8 part by weight, with respect to 100 parts by weight of the cured resin component. If the content is less than 0.3 part by weight it will be difficult to inhibit generation of Newton rings. The content is preferably not greater than 1.0 part by weight because, although generation of Newton rings can be satisfactorily prevented, the haze value increases and tends to cause fuzziness of image and character data on the liquid crystal display.

Any fine particles B having a mean primary diameter of no greater than 100 nm may be used, with no particular restrictions on the type of compound. As examples there may be mentioned fine particles composed of metal oxides such as $Al_2O_3$, $Bi_2O_3$, $CeO_2$, $In_2O_3$, ($In_2O_3 \cdot SnO_2$), $HfO_2$, $La_2O_3$, $MgF_2$, $Sb_2O_5$, ($Sb_2O_5SnO_2$), $SiO_2$, $SnO_2$, $TiO_2$, $Y_2O_3$, $ZnO$ and $ZrO_2$, or metal fluorides. Two or more types of compound may also be used in combination. A metal oxide and metal fluoride may also be used simultaneously. However, if the superfine particles B have a refractive index that is larger than the refractive index of the cured resin component, the haze value of the obtained cured resin layer will be too high. Consequently, the superfine particles B preferably have a lower refractive index in order to increase the options for the cured resin component. As examples of such materials there may be mentioned $SiO_2$, $MgF_2$ and the like. Since the superfine particles B have a very large surface to volume ratio and therefore generally tend to aggregate, they will usually be produced and sold in the form of a slurry, dispersed in a solvent with addition of a dispersing agent. Examples of dispersing agents to be used include aliphatic amine-based, sulfonic acid amide-based, e-caprolactone-based, hydrostearic acid-based, polycarboxylic acid-based and polyester amine-based types. The dispersion medium (solvent) used may be an ordinary one such as alcohol, water, a ketone or an aromatic-based solvent.

A smaller mean primary diameter of the superfine particles B is preferred in order to avoid whitening of the cured resin layer by internal haze, and it is preferably no greater than 100 nm. The mean primary diameter of the superfine particles B is more preferably no greater than 80 nm, and even more preferably no greater than 60 nm. The lower limit is not particularly restricted but is preferably 5 nm. The mean primary diameter of the superfine particles B may be measured using a laser scattering particle size distribution analyzer. The actual sizes can also be easily measured using a transmission electron microscope or the like. Specifically, the cured resin layer containing the superfine particles B is embedded in an epoxy resin or the like and the epoxy resin layer is thoroughly cured and then thinly sliced with a microtome to prepare a measuring sample. The measuring sample is then observed with a transmission electron microscope, the sizes of the superfine particles are randomly measured at 10 locations and the measured values are averaged to determine the mean primary diameter.

The content of the superfine particles B dispersed in the cured resin layer may be 1-20 parts by weight, preferably 2-10 parts by weight and more preferably 3-7 parts by weight of superfine particles B with respect to 100 parts by weight of the cured resin component. The superfine particles B have an effect of leveling the cured resin layer. A superfine particle B content in the aforementioned range will result in formation of suitable unevenness on the cured resin layer surface by a synergistic effect with the fine particles A, and unevenness on the surface will thus provide a function of preventing generation of Newton rings while also reducing sparkling on the liquid crystal display. If the superfine particle B component is present at less than 1 part by weight, leveling of the cured resin layer will be more difficult and unevenness on the cured resin layer surface will be too large, such that sparkling will become more noticeable on the liquid crystal display. If the superfine particle B component is present at greater than 20 parts by weight, leveling of the cured resin layer will become too pronounced, thereby an adequate function of preventing Newton rings won't be put forth.

<Optical Interference Layer>

An optical interference layer may be formed between the polymer film A and the transparent conductive layer. The color tone of the touch panel can improve by forming an optical interference layer.

The position of the optical interference layer is between the polymer film A and the transparent conductive layer, and from the standpoint of productivity and effect, it is convenient to form the cured resin layer, optical interference layer and transparent conductive layer in that order from the polymer film A side.

The optical interference layer is composed of a high refractive index layer and a low refractive index layer, with the low refractive index layer preferably in contact with the transparent conductive layer. The high refractive index layer and low refractive index layer are made of crosslinked polymers, and either or both the high refractive index layer and low refractive index layer preferably contain superfine particles with a mean primary diameter of no greater than 100 nm. The crosslinked polymer used may be a crosslinked polymer obtained from hydrolysis and condensation polymerization of a metal alkoxide, or alternatively a crosslinked polymer of a thermosetting resin or radiation curing resin.

Among crosslinked polymers obtained from hydrolysis and condensation polymerization of metal alkoxides, there are preferred crosslinked polymers obtained from hydrolysis and condensation polymerization of titanium alkoxides and zirconium alkoxides, as well as alkoxysilanes, from the standpoint of achieving excellent mechanical strength, stability and cohesion.

Examples of titanium alkoxides include titanium tetraisopropoxide, tetra-n-propyl orthotitanate, titanium tetra-n-butoxide and tetrakis(2-ethylhexyloxy) titanate, and examples of zirconium alkoxides include zirconium tetraisopropoxide and zirconium tetra-n-butoxide.

Examples of alkoxysilanes include tetramethoxysilane, tetraethoxysilane, methyltrimethoxysilane, methyltriethoxysilane, dimethyldimethoxysilane, γ-glycidoxypropyl trimethoxysilane, β-(3,4-epoxycyclohexyl)ethyltrimethoxysilane, vinyltrimethoxysilane, N-β(aminoethyl)-γ-aminopropyltrimethoxysilane, N-β(aminoethyl)-γ-aminopropylmethyldimethoxysilane and γ-aminopropyltriethoxysilane. These alkoxysilanes are preferably used in mixtures of two or more in most cases, as necessary, from the standpoint of mechanical strength and cohesion of the layer and solvent resistance, and an amino group-containing alkoxysilane is preferably present in a range of 0.5-60% based on the total weight of the alkoxysilane composition.

These metal alkoxides may be used as monomers or as suitable oligomers obtained by hydrolysis and dehydrating condensation, but normally they will be dissolved in an appropriate organic solvent to prepare a diluted coating solution for coating onto a substrate. The coated film layer formed on the substrate undergoes hydrolysis due to moisture in the air, followed by dehydrating condensation. Condensation polymerization can usually only proceed with appropriate heat treatment, and heat treatment for a few minutes or longer at a temperature of 100° C. or above during the coating process is preferred. In some cases, the heat treatment may be carried out in tandem with irradiation of the coated layer with active light rays such as ultraviolet rays, to further increase the degree of crosslinking.

As diluting solvents there may be used alcohol-based and hydrocarbon-based solvents, of which preferred examples include ethanol, 2-propanol, butanol, 2-methyl-1-propanol, 1-methoxy-2-propanol, hexane, cyclohexane and ligroin, but there may also be used polar solvents such as xylene, toluene, cyclohexanone, methyl isobutyl ketone, isobutyl acetate and the like. These may be used alone or as mixed solvents comprising two or more different types.

The refractive index may be adjusted by adding superfine particles with a mean primary diameter of no greater than 100 nm to either or both the high refractive index layer and low refractive index layer. The mean primary diameter is preferably no greater than 100 nm, and more preferably no greater than 50 nm. By limiting the mean primary diameter of the superfine particles to no greater than 100 nm it is possible to form a satisfactory optical interference layer with no whitening of the coated layer.

Examples of superfine particles having a mean primary diameter of no greater than 100 nm include superfine particles of metal oxides such as $Al_2O_3$, $Bi_2O_3$, $CeO_2$, $In_2O_3$, $In_2O_3 \cdot SnO_2$, $HfO_2$, $La_2O_3$, $Sb_2O_5$, $Sb_2O_5SnO_2$, $SnO_2$, $TiO_2$, $Y_2O_3$, $ZnO$, $ZrO_2$ and the like, as well as superfine particles composed of metal fluorides such as $MgF_2$.

The transparent conductive laminate of the invention obtained in this manner may be used as the movable electrode substrate or a fixed electrode substrate of a touch panel.

The transparent conductive laminate of the invention described above may be used for the electrode substrates of a touch panel, and the touch panel may be used in a touch panel-equipped liquid crystal display.

The polarizing plate used in this case will be a polarizing film as described below, laminated as necessary with a protective film on one or both sides. As examples of polarizing films there may be mentioned (i) oriented iodine and/or dichromatic organic dye-based polarizing films obtained by adsorption of iodine and/or dichromatic organic dyes on hydrophilic polymer films such as polyvinyl alcohol-based films, partially formalated polyvinyl alcohol-based films, ethylene-vinyl acetate copolymer-based saponified films and cellulose-based films, (ii) oriented polyene-based polarizing films obtained by dehydration treatment of polyvinyl alcohol-based films to form polyenes, and (iii) oriented polyene-based-polarizing films obtained by dehydrochlorination of poly vinyl chloride films to form polyenes. These will ordinarily be used at thicknesses of 10-80 μm.

As polarizing films there may be used films produced by adding a dichromatic organic dye in a hydrophobic polymer in advance and then casting it into a film by a publicly-known process, stretching it in at least one direction and heat setting it. The hydrophobic polymer may be any material which does not undergo changes such as shrinkage or expansion under conditions with a temperature of 100° C. or below and a relative humidity of 80% or lower, and specific examples include polyester-based resins such as polyethylene terephthalate and polybutylene terephthalate, polycarbonate-based resins, polyamide-based resins such as nylon-6, nylon-66 and nylon-12, polyvinyl chloride, polyolefin-based resins such as polypropylene, polyether-based resins and polysulfone-based resins, among which polyethylene terephthalate, nylon-6, nylon-66 and nylon-12 are preferred. The dichromatic organic dye has dichroism based on its molecular structure, and it is most preferably heat resistant and weather resistant. Production of such a polarizing film is accomplished by mixing a dichromatic organic dye with the hydrophobic polymer using a Henschel mixer, blender or the like and then cast into a film by an ordinary publicly-known method such as T-die extrusion, inflation, solution casting or the like, before being fed to the stretching process. The stretching process is carried out to accomplish stretching the film by as high power as possible in one direction at a suitable temperature above the glass transition point and below the melting point of the resin, to increase the surface area while reducing the thickness. In this case, the stretching direction is not particularly restricted to one direction, and if necessary stretching by low power may be carried out in the direction orthogonal to the direction of stretching by high power in order to improve the mechanical strength of the film. Another type of polymer may also be blended with the hydrophobic polymer in a range which does not inhibit the object of the invention, and there may be added various inorganic or organic additives such as antioxidants, heat stabilizers, lubricants, ultraviolet absorbers, nucleating agents or surface protrusion-forming agents. The thicknesses of such polarizing films are preferably 20-200 μm.

As mentioned above, a protective film may be laminated on one or both sides of the polarizing film if necessary. As the protective film there may be used an optical isotropy film with a retardation value of no greater than 30 nm, and/or a film stretched only in one direction. Particularly when a polarizing plate is used on the input operation side, a protective film is preferably laminated on the side of the polarizing film opposite to the side on which the transparent conductive laminate is to be laminated, for increased reliability.

As optical isotropy films having retardation values of no greater than 30 nm, to be used as the aforementioned protective film, there may be mentioned films made of polycarbonate-based resins, polysulfone-based resins such as polysulfone, polyethersulfone and polyallylsulfone, polyolefin-based resins, acetate-based resins such as cellulose triacetate and polyallylate-based resins, having thicknesses of 10-20 μm.

As plastic films stretched in only one direction for use as the protective film there may be mentioned films obtained by stretching resins, for example, polyester-based resins such as polyethylene terephthalate, polyethylene isophthalate, polyphenylene isophthalate, polybutylene terephthalate and polyethylene-2,6-naphthalate, polysulfone-based resins such as polysulfone, polyethersulfone and polyallylsulfone, polymethylpentene, polystyrene, polyolefin, polyamide, polymethyl methacrylate, polyvinyl chloride and triacetate, in a single direction, but from the standpoint of chemical resistance, the aforementioned polyester films stretched to at least 5% and preferably 50-80% in only the longitudinal or lateral direction, and heat set from 100° C.×60 min to 230° C.×5 min to a thickness of 10-200 μm, are preferred.

Also, when the polarizing plate is used on the input operation side of the touch panel, a layer having an anti-reflection function, an anti-glare function or an abrasion resistant function may be formed on the input operation side of the polarizing plate.

The transparent conductive laminate (R) of the invention is a laminate having a transparent conductive layer on at least one surface of a transparent substrate made of a polymer film or glass. As a polymer film there may be used the same type as the polymer film A, made of a polymer having a photoelastic constant of no greater than $70 \times 10^{-12}$ $Pa^{-1}$ ($70 \times 10^{-13}$ $cm^2$/dyne), which is used in the transparent conductive laminate (P) of the invention. Such a polymer film may consist of two or more laminated layers, or it may be laminated with a glass substrate. However, the retardation value of the transparent substrate must conform to the optical design of the overall touch panel-equipped liquid crystal display.

The thickness of the transparent substrate is preferably 50-2000 μm, and more preferably 75-1500 μm. With a thickness of less than 50 μm, manufacturing the transparent conductive layer is rendered more difficult. If the thickness is greater than 2000 μm, the thickness of the touch panel becomes too large, making it unsuitable for use in portable information-processing equipments.

The transparent substrate is preferably either an optical isotropy substrate with a retardation value of no greater than 30 nm, or a substrate exhibiting a ¼ wavelength retardation.

When the transparent substrate is an optical isotropy substrate, the touch panel is preferably fabricated with the optical axis of the transparent conductive laminate R aligned either parallel or orthogonal to the optical axis of the transparent conductive laminate P.

When the transparent substrate is a substrate exhibiting a ¼ wavelength retardation, the transparent conductive laminate R may also serve as the retardation film 2. In this case, the touch panel is fabricated so that the optical axis of the transparent conductive laminate R and the optical axis of the transparent conductive laminate P may be aligned orthogonal to each other.

The touch panel of the invention may be usually used with a Reflective LCD, Transmissive LCD or Transflective LCD, which require polarizing plates for producing an image. As examples there may be mentioned various modes of liquid crystal displays such as TN, STN, ECB (Electrically Controlled Birefringence), CSH (Color Super Homeotropic), OCB (Optical Compensated Bend), HAN (Half Aligned Nematic), VA (Vertical Aligned), IPS (In-Plane Switching), ferroelectric, antiferroelectric, cholesteric phase transition and GH (Guest Host).

The touch panel of the invention exhibits a significant effect when used in combination with a liquid crystal display, but it may also be used for displays other than a liquid crystal display. An OLED (Organic Light-Emitting Diode) may be mentioned, for example.

A touch panel fabricated in the manner described above may be mounted on a display such as a liquid crystal display (LCD), OLED (Organic Light-Emitting Diode) or the like, specifically on the viewing side, to produce a circular polarizing plate-type "inner" touch panel-equipped display, or an integrated-type "inner" touch panel-equipped display.

EFFECT OF THE INVENTION

According to the invention there is provided a transparent conductive laminate which can be used to produce a touch panel with excellent visibility and no coloration at high temperatures, as well as touch panel-equipped liquid crystal displays employing it.

EXAMPLES

The invention will now be explained in greater detail through the following examples, with the understanding that the invention is in no way limited by the examples.

(Evaluation Methods)

(1) Measurement of Retardation Value and Photoelastic Constant

The retardation value and photoelastic constant were measured using an "M150" spectroscopic ellipsometer (JASCO Corp.)

(2) Measurement of Glass Transition Temperature (Tg) of Polymer

This was measured using a "DSC2920 Modulated DSC" (TA Instruments). The measurement was performed after polymerization of the resin, in the form of flakes or chips, before casting the film.

(3) High Temperature Test of Touch Panel

The touch panel was placed on a 80° C.-heated mirror surface hot plate with the polarizing plate facing upward, and the color change of the touch panel was examined after leaving for one minute.

(4) Observation of Color Stripes in Touch Panel

The color stripes were observed from the polarizing plate side of the touch panel under a three wavelength fluorescent lamp.

The monomer structures of the polycarbonate used in the examples and comparative examples are shown below.

Example 1 and Comparative Example

Aqueous sodium hydroxide and ion-exchanged water were charged into a reactor equipped with a stirrer, thermometer and reflux condenser, monomers (E) and (F) having the structures shown above were dissolved in a molar ratio of 50:50, and a small amount of hydrosulfite was added. After adding methylene chloride, phosgene was blown in at 20° C. for approximately 60 minutes. Next, p-tert-butylphenol was added for emulsification, triethylamine was added, and the mixture was stirred at 30° C. for approximately 3 hours to complete the reaction. Upon completion of the reaction, the organic phase was separated, and the methylene chloride was evaporated off to obtain a polycarbonate copolymer. The compositional ratio of the obtained copolymer was approximately equivalent to the monomer charging ratio. The glass transition temperature was 215° C.

The copolymer was then dissolved in methylene chloride to prepare a dope solution with a solid concentration of 18 wt %. A film was cast from the dope solution, and the film was uniaxially stretched at 220° C. by 1.30-power in the longitudinal direction to obtain a retardation film (3) having a thickness of 95 μm, a retardation value of 138 nm and a photoelastic constant of $60 \times 10^{-12}$ $Pa^{-1}$.

Next, coating solution A was prepared comprising 50 parts by weight of a polyester acrylate (ARONIX M8060, product of TOAGOSEI Co., Ltd.), 50 parts by weight of dipentaerythritol hexaacrylate (DPHA, product of Nippon Kayaku Co., Ltd.), 7 parts by weight of a photoinitiator (IRGACURE 184, product of Ciba-Geigy) and 200 parts by weight of 1-methoxy-2-propanol as a diluent. To the coating solution A there were then added silicone crosslinked fine particles with a mean diameter of about 3 μm (TOSPEARL 130, product of GE Toshiba Silicones) as fine particles, at 0.2 part by weight to 100 parts by weight of the resin component, to obtain coating solution B. Separately, the silicone crosslinked fine particles with a mean diameter of about 3 μm (TOSPEARL 130, product of GE Toshiba Silicones) were added as fine particles to the coating solution A at 0.5 part by weight to 100 parts by weight of the resin component, to obtain coating solution C.

Coating solution B was coated onto one side of the retardation film (3) using a microgravure coater and dried at 60° C. for 1 minute, and then a high-pressure mercury lamp was used at an intensity of 160 w/cm for curing of the coated layer under a cumulative dose of 450 mJ/cm$^2$ to form a light-scattering layer (2) with a thickness of approximately 2 μm. The haze value of the light-scattering layer alone was 0.5%. A microgravure coater was then used to coat coating solution C onto the side of the retardation film (3) opposite to the side on which the light-scattering layer was formed, and then after drying at 60° C. for 1 minute, a high-pressure mercury lamp was used at an intensity of 160 w/cm for curing of the coated layer under a cumulative dose of 450 mJ/cm$^2$ to form a cured resin layer (4) with a thickness of approximately 2 μm.

Next, an indium-tin oxide target with indium oxide and tin oxide in a weight ratio of 9:1 and a packing density of 98% was used for forming an ITO layer on the cured resin layer (4) by sputtering, to obtain a transparent conductive laminate (14-1) for Example 1. The thickness of the ITO layer was 20 nm, and the resistance value was 330Ω/☐. The retardation value was virtually unchanged at 137 nm.

Coating solution A was coated onto one side of the retardation film (3) using a microgravure coater and dried at 60° C. for 1 minute, and then a high-pressure mercury lamp was used at an intensity of 160 w/cm for curing of the coated layer under a cumulative dose of 450 mJ/cm$^2$ to form a transparent resin layer with a thickness of approximately 2 μm. The haze value of the transparent resin layer alone was 0%. In a similar manner, coating solution C was used to form a cured resin layer with a thickness of approximately 2 μm on the side of the retardation film (3) opposite to the side on which the transparent resin layer was formed. An ITO layer was similarly formed on the cured resin layer to obtain a transparent conductive laminate (14-1) for Comparative Example 1. The thickness of the ITO layer was 20 nm and the resistance value was 340Ω/☐. The retardation value was virtually unchanged at 137 nm.

Separately, an SiO$_2$ layer was formed on both sides of a 1.1 mm-thick glass substrate (8) by dip coating, and then an 18 nm-thick ITO layer was formed by sputtering as a transparent conductive layer to obtain a transparent conductive laminate (15). Dot spacers with a 7 μm height, 70 μm diameter and 1.5 mm pitch were then formed on the ITO layer.

Next, after forming an external lead circuit, insulating layer and adhesive layer, the transparent conductive laminate (14-1) and transparent conductive laminate (15) were attached together so that the transparent conductive layer (ITO layer) sides of the transparent conductive laminate (14-1) and transparent conductive laminate (15) might face each other, to fabricate an analog-type touch panel.

A triacetate film was laminated onto both sides of a uniaxially stretched polyvinyl alcohol film comprising iodine as a polarizer via an adhesive to obtain a 150 μm-thick polarizing plate (13) for the input operation side. An anti-glare hard coat layer was formed on the input operation side of the polarizing plate (13).

The polarizing plate (13) and the transparent conductive laminate (14-1) were laminated via an adhesive so that the optical axis of the polarizing plate (13) and the optical axis of the retardation film (3) might form an angle of 45°, to fabricate touch panels for Example 1 and Comparative Example 1.

The touch panels were subjected to high-temperature testing and color stripes observation. The results are shown in Table 1.

Example 2

An approximately 2 μm-thick light-scattering layer (2) was formed on one side of the retardation film (3) of Example 1 in the same manner as Example 1. The haze value of the light-scattering layer alone was 0.5%. An approximately 2 μm-thick cured resin layer (4) was then formed on the side of the retardation film (3) opposite to the side on which the light-scattering layer was formed, in the same manner as Example 1.

Next, tetrabutoxy titanate ("B-4" by Nihon Soda) was diluted with a mixed solvent of ligroin (special grade product by Wako Pure Chemical Industries) and butanol (special grade product by Wako Pure Chemical Industries) to prepare coating solution D.

γ-Glycidoxypropyltrimethoxysilane ("KBM403" by Shin-Etsu Chemical Co., Ltd.) and methyltrimethoxysilane ("KBM13" by Shin-Etsu Chemical Co., Ltd.) were mixed in a molar ratio of 1:1 and hydrolysis of the silanes was carried out by a publicly-known method with aqueous acetic acid (pH=3.0) to obtain silane hydrolysate. Next, N-β(aminoethyl)-γ-aminopropylmethoxysilane ("KBM603" by Shin-Etsu Chemical Co., Ltd.) was added at 1 part by weight to 20 parts by weight of the aforementioned silane hydrolysate, and the mixture was diluted with a mixed solution of isopropyl alcohol and n-butanol to prepare alkoxysilane coating solution E.

After mixing coating solution D and coating solution E so that the tetrabutoxy titanate component of coating solution D and the alkoxysilane component of coating solution E might be in a weight ratio of 70:30, TiO$_2$ superfine particles having a primary diameter of 20 nm were mixed with the solution mixture so that the TiO$_2$ superfine particles and the metal alkoxide (total of tetrabutoxy titanate and alkoxysilane) might be in a weight ratio of 30:70, to prepare coating solution F. Coating solution F was coated onto the cured resin layer of the retardation film 3 using a microgravure coater and then dried at 130° C. for 2 minutes to form a high refractive index layer (9) with a thickness of 55 nm. Next, coating solution E was coated onto the high refractive index layer using a microgravure coater and dried at 130° C. for 2 minutes to form a low refractive index layer (10) with a thickness of 45 nm, thereby forming an optical interference layer comprising a high refractive index layer and a low refractive index layer. An indium-tin oxide target with indium oxide and tin oxide in a weight ratio of 9:1 and a packing density of 98% was used to form an ITO layer on the low refractive index layer by sputtering, to obtain a transparent conductive laminate (14-2) for Example 2. The ITO layer thickness was approximately 20 nm, and the surface resistance was approximately 300Ω/☐. The retardation value was virtually unchanged at 137 nm.

Separately, dot spacers with a 7 μm height, 70 μm diameter and 1.5 mm pitch were formed on the ITO layer of the transparent conductive laminate (15) by exactly the same method as Example 1.

Next, after forming an external lead circuit, insulating layer and adhesive layer, the transparent conductive laminate (14-2) and transparent conductive laminate (15) were attached together so that the transparent conductive layer sides of the transparent conductive laminate (14-2) and transparent conductive laminate (15) might face each other, to fabricate an analog-type touch panel.

A polarizing plate (13) was obtained in exactly the same manner as Example 1. An anti-glare hard coat layer was formed on the input operation side of the polarizing plate (13).

The polarizing plate (13) and the transparent conductive laminate (14-2) were laminated via an adhesive so that the optical axis of the polarizing plate (13) and the optical axis of the retardation film (3) might form an angle of 45°, to fabricate a touch panel for Example 2.

The touch panel was subjected to high-temperature testing and color stripes observation. The results are shown in Table 1.

|  | High temperature testing results | Color stripes observation results |
|---|---|---|
| Example 1 | No coloration | No interference color stripes |
| Example 2 | No coloration | No interference color stripes |
| Comparative Example 1 | No coloration | Interference color stripes were seen |

Example 3 and Comparative Example 2

A λ/4 retardation film (18) was attached to the polarizing plate (19) of a liquid crystal display comprising a polarizing plate (19), retardation film (20), liquid crystal cell (21) and polarizing plate (22), in such a manner that the optical axis of the polarizing plate (19) and the optical axis of the retardation film (18) formed an angle of 135°. Next, the touch panel of Example 2 was situated on the liquid crystal display across a gap of 0.4 mm so that the optical axis of the polarizing plate (13) and the optical axis of the polarizing plate (19) might be parallel, to fabricate a circular polarizing plate-type touch panel-equipped liquid crystal display. The liquid crystal display produced clearly visible images even outdoors. No color change was seen in the liquid crystal display with or without the touch panel.

A transparent conductive laminate (Comparative Example 2) was also obtained using the following retardation film instead of the retardation film (3) of the transparent conductive laminate of the touch panel of Example 2. Specifically, C1400 (glass transition temperature: 155° C.) by Teijin Chemicals Ltd. was dissolved in methylene chloride to prepare a dope solution with a solid concentration of 18 wt %. A film was cast from the dope solution and uniaxially stretched by 1.05-power in the longitudinal direction at 155° C. to obtain a retardation film (3) with a thickness of 70 μm, a retardation value of 138 nm and a photoelastic constant of $90 \times 10^{-12}$ $Pa^{-1}$.

Next, a light-scattering layer was formed on one side of the retardation film (3) in exactly the same manner as Example 2. A cured resin layer, a high refractive index layer, a low refractive index layer and an ITO layer were formed in that order on the side opposite to the side on which the light-scattering layer was formed to obtain a transparent conductive laminate (14-2). The thickness of the ITO layer was 20 nm, and the resistance value was 310Ω/□. The retardation value changed to 148 nm.

The transparent conductive laminate (14-2) was used to fabricate a touch panel-equipped liquid crystal display having the same construction as Example 3. Outdoors, the liquid crystal display had a more yellow tint as compared to absence of the touch panel. High temperature testing of the touch panel produced arc-shaped coloration from the adhesive (seal) section toward the interior.

Example 4

Coating solution G was prepared comprising 100 parts by weight of urethane acrylate, 7 parts by weight of a photoinitiator (IRGACURE 184, product of Ciba-Geigy), 135 parts by weight of 1-methoxy-2-propanol as a diluent and 135 parts by weight of isopropanol. To the coating solution G there were then added silicone crosslinked fine particles with a mean diameter of about 3 μm (TOSPEARL 130, product of GE-Toshiba Silicones) as fine particles A, at 0.2 part by weight to 100 parts by weight of the resin component, to obtain coating solution H. Separately, there were added to the coating solution G the silicone crosslinked fine particles with a mean particle size of about 3 μm (TOSPEARL 130, product of GE-Toshiba Silicones) as fine particles A at 0.7 part by weight to 100 parts by weight of the resin component, and $MgF_2$ superfine particles as superfine particles B at 5 parts by weight to 100 parts by weight of the resin component, to obtain coating solution I.

Coating solution H was coated onto one side of a polymer film (12) (ZEONOR film, ZF14-100, product of Nihon Zeon) having a thickness of 100 μm, a glass transition temperature of 136° C., a retardation value of 5.5 nm and a photoelastic constant of $6.5 \times 10^{-12}$ $Pa^{-1}$ using a microgravure coater and dried at 60° C. for 1 minute, and then a high-pressure mercury lamp was used at an intensity of 160 w/cm for curing of the coated layer under a cumulative dose of 450 $mJ/cm^2$ to form a light-scattering layer (2) with a thickness of approximately 2 μm. The haze value of the light-scattering layer alone was 0.5%. A microgravure coater was then used to coat coating solution I onto the side of the polymer film (12) opposite to the side on which the light-scattering layer was formed, and then after drying at 60° C. for 1 minute, a high-pressure mercury lamp was used at an intensity of 160 w/cm for curing of the coated layer under a cumulative dose of 450 $mJ/cm^2$ to form a cured resin layer (4) with a thickness of approximately 2 μm.

Next, coating solution E and coating solution F were prepared in the same manner as Example 2. Coating solution F was coated onto the cured resin layer (4) of the polymer film (12) using a microgravure coater and then dried at 125° C. for 2 minutes to form a high refractive index layer (9) with a thickness of 55 nm. Coating solution E was then coated onto the high refractive index layer using a microgravure coater and then dried at 125° C. for 2 minutes to form a low refractive index layer (10) with a thickness of 45 nm, thereby forming an optical interference layer comprising a high refractive index layer and a low refractive index layer. An indium-tin oxide target with indium oxide and tin oxide in a weight ratio of 9:1 and a packing density of 98% was used to form an ITO layer on the low refractive index layer by sputtering, thereby obtaining a transparent conductive laminate (16). The ITO layer thickness was approximately 20 nm, and the surface resistance was approximately 300Ω/□. The retardation value was virtually unchanged. A single layer λ/4 retardation film (11) and a single layer λ/2 retardation film (3) was laminated to the light-scattering layer (2) of the transparent conductive laminate to obtain a transparent conductive laminate (17).

Separately, Dot spacers with a 7 μm height, 70 μm diameter and 1.5 mm pitch were formed on the ITO layer of the transparent conductive laminate (16) by exactly the same method as Example 1.

Next, after forming an external lead circuit, insulating layer and adhesive layer the transparent conductive laminate (17) and transparent conductive laminate (16) were attached together so that the transparent conductive layer sides of the transparent conductive laminate (16) and transparent conductive laminate (17) might face each other, to fabricate an analog-type touch panel.

A polarizing plate (13) was obtained in exactly the same manner as Example 1. An anti-glare hard coat layer was formed on the input operation side of the polarizing plate (13).

The polarizing plate (13) was laminated to the transparent conductive laminate (17) via an adhesive to obtain a touch panel. The touch panel, a liquid crystal cell (21) and a polarizing plate (22) were then laminated to fabricate an integrated-type touch panel-equipped liquid crystal display for Example 4. The liquid crystal display produced clearly visible images even outdoors.

INDUSTRIAL APPLICABILITY

The transparent conductive laminate of the invention has reduced light reflection with no coloration, and also has satisfactory productivity. The laminate may therefore be used to provide touch panels with excellent visibility and high reliability for outdoor use, as well as touch panel-equipped liquid crystal displays employing them.

What is claimed is:

1. A transparent conductive laminate comprising:
    a film made of a polymer with a photoelastic constant of no greater than $70 \times 10^{-12}$ $Pa^{-1}$ (polymer film A),
    a light-scattering layer with a haze value in the range of 0.2-1.4% formed directly on one side thereof, and
    a transparent conductive layer formed on the other side thereof,
    wherein the laminate exhibits a $\lambda/4$ retardation,
    wherein an optical interference layer comprising a high refractive index layer and a low refractive index layer is formed between said polymer film A and said transparent conductive layer so that said transparent conductive layer is in contact with the low refractive index layer side, the high refractive index layer and low refractive index layer are both made of crosslinked polymers
    wherein a cured resin layer is between said first polymer film and said transparent conductive layer, and wherein said cured resin layer contains first fine particles having a mean primary diameter of 0.5-5 µm and second fine particles having a mean primary diameter of no greater than 100 nm, and
    wherein said cured resin has a first fine particle content of at least 0.3 part by weight and less than 1.0 part by weight to 100 parts by weight of a cured resin component.

2. A transparent conductive laminate comprising:
    a film made of a polymer with a photoelastic constant of no greater than $70 \times 10\text{-}12$ $Pa^{-1}$ (polymer film A),
    a light-scattering layer with a haze value in the range of 0.2-1.4% formed on one side of polymer film A, and
    a transparent conductive layer formed on the other side of polymer film A, and
    a cured resin layer formed between said polymer film A and said transparent conductive layer, said cured resin layer containing two types of fine particles,
    wherein said two types of particles includes first particles having a mean primary diameter of 0.5-5 µm and second particles having a mean primary diameter of no greater than 100 nm, and
    wherein the laminate exhibits a $\lambda/4$ retardation.

3. The transparent conductive laminate according to claim 2,
    wherein a center line average roughness (Ra) of said light scattering layer is 0.005-0.04 µm.

4. The transparent conductive laminate according to claim 2,
    wherein said polymer film A is a thermoplastic resin with a glass transition temperature (Tg) of 170° C. or above.

5. A transparent conductive laminate according to claim 4, wherein said thermoplastic resin is a polycarbonate.

6. A transparent conductive laminate according to claim 2, wherein said polymer film A is a single layer $\lambda/4$ retardation film.

7. A transparent conductive laminate according to claim 2,
    wherein said polymer film A is a laminate film having two or more layers, said two or more layers including a single layer $\lambda/4$ retardation film and a single layer $\lambda/2$ retardation film.

8. A transparent conductive laminate according to claim 2,
    wherein said polymer film A is between a third polymer film and said transparent conductive layer, said third polymer film having a photoelastic constant of no greater than $70 \times 10^{-12}$ $Pa^{-1}$.

9. A transparent conductive laminate according to claim 8,
    wherein said polymer film A has a retardation value of no greater than 30 nm, and said third polymer film is a laminated retardation film comprising a single layer $\lambda/4$ retardation film and a single layer $\lambda/2$ retardation film.

10. A transparent conductive laminate according to claim 9,
    wherein said polymer film A is a single layer $\lambda/4$ retardation film, and said third polymer film is a single layer $\lambda/2$ retardation film.

11. A transparent conductive laminate according to claim 2,
    wherein an optical interference layer is between said polymer film A and said transparent conductive layer.

12. A transparent conductive laminate according to claim 11,
    wherein a cured resin layer is between said polymer film A and said optical interference layer.

13. A transparent conductive laminate according to claim 11, wherein said optical interference layer comprises a high refractive index layer and a low refractive index layer, said high and low refractive index layers being crosslinked polymers.

14. A transparent conductive laminate according to claim 13, wherein said transparent conductive layer is in contact with said low refractive index layer.

15. A touch panel comprising:
    the transparent conductive laminate according to claim 2,
    wherein a first polarizing plate is formed on a side of said light-scattering layer, and
    wherein a gap is between said movable electrode substrate and said fixed electrode substrate.

16. A touch panel-equipped liquid crystal display comprising:
    the touch panel according to claim 15;
    a liquid crystal cell between said touch panel and a second polarizing plate.

17. The touch panel-equipped liquid crystal display according to claim 16,
    wherein a third polarizing plate is between two retardation films, said liquid crystal cell being between said third polarizing plate and said second polarizing plate.

* * * * *